United States Patent [19]

Terhune et al.

[11] Patent Number: 5,577,083
[45] Date of Patent: Nov. 19, 1996

[54] METHOD AND APPARATUS FOR ELECTRO-PROTECTION OF PIPING SYSTEMS AND REACTOR-INTERNALS FROM STRESS CORROSION CRACKING

[75] Inventors: James H. Terhune, San Jose; Barry M. Gordon, Monte Sereno, both of Calif.

[73] Assignee: General Electric Company, San Jose, Calif.

[21] Appl. No.: 384,997

[22] Filed: Feb. 7, 1995

Related U.S. Application Data

[63] Continuation-in-part of Ser. No. 239,773, May 9, 1994, Pat. No. 5,444,747.

[51] Int. Cl.$^6$ ................................................ G21C 19/28
[52] U.S. Cl. .......................... 376/372; 376/305; 376/259; 376/255; 376/194
[58] Field of Search ..................... 376/372, 305, 376/259, 255, 194; 204/195 C, 153.71, 404, 196, 197, 204, 205, 228; 976/DIG. 138, DIG. 411

[56] References Cited

U.S. PATENT DOCUMENTS

| | | | |
|---|---|---|---|
| 3,616,417 | 10/1971 | Wilson | 204/195 |
| 3,625,820 | 12/1971 | Gluntz | 376/372 |
| 3,766,042 | 10/1973 | Wilson | 204/195 C |
| 3,815,038 | 6/1974 | Davis | 330/30 D |
| 4,017,370 | 4/1977 | Wootten | 204/147 |
| 4,048,558 | 9/1977 | Goodman | 324/57 R |
| 4,080,272 | 3/1978 | Ferry et al. | 204/147 |
| 4,117,396 | 9/1978 | Berkey et al. | 324/33 |
| 4,123,338 | 10/1978 | Wootten | 204/147 |
| 4,294,667 | 10/1981 | Yamamoto et al. | 204/1 T |
| 4,566,950 | 1/1986 | Miles | 204/1 T |
| 4,752,368 | 6/1988 | Wasson | 204/147 |
| 4,828,665 | 5/1989 | McCready | 204/196 |
| 5,011,708 | 4/1991 | Kelly et al. | 427/443.1 |
| 5,101,159 | 3/1992 | Bossard et al. | 324/456 |
| 5,122,330 | 6/1992 | Solomon et al. | 376/245 |
| 5,171,517 | 12/1992 | Solomon et al. | 376/245 |
| 5,338,417 | 8/1994 | Brucken et al. | 204/147 |

FOREIGN PATENT DOCUMENTS

| | | | |
|---|---|---|---|
| 2073530 | 1/1994 | Canada | C23F 13/04 |
| 0169374 | 1/1986 | European Pat. Off. | C23F 13/02 |

*Primary Examiner*—Charles T. Jordan
*Assistant Examiner*—Meena Chelliah
*Attorney, Agent, or Firm*—James E. McGinness

[57] ABSTRACT

A method and an apparatus for electrically suppressing electrochemical potential near highly susceptible components of a boiling water reactor. A small self-powered, electrical device is affixed to the metal area to be protected, which device has the capacity to locally suppress electrochemical potential automatically and continuously without provision for external power supplies, cables, penetrations, or other paraphernalia usually associated with electrical and electronic systems. The result is that components susceptible to intergranular stress corrosion cracking are not as sensitive to the details of the water chemistry flowing over them and do not crack as much, or as rapidly, as presently. The new technique is based on the concept of supplying electrons directly and locally to the sensitized zone(s) of the metal, thereby inhibiting intergranular stress corrosion cracking. The source of the electrons is β-emitting material which is contained in a housing attached to the metal. The electron source is electrically connected to the sensitized zone of the metal. The current of electrons has a magnitude sufficient to compensate for the electrons lost by the metal to electron-accepting fluid in contact with the metal.

19 Claims, 2 Drawing Sheets

METHOD AND APPARATUS FOR ELECTRO-PROTECTION OF PIPING SYSTEMS AND REACTOR-INTERNALS FROM STRESS CORROSION CRACKING

This application is a continuation-in-part U.S. patent application Ser. No. 08/239,773 filed on May 9, 1994, now U.S. Pat. No. 5,444,747.

FIELD OF THE INVENTION

This invention generally relates to reducing the corrosion potential of components exposed to high-temperature (i.e., about 150° C. or greater) water.

BACKGROUND OF THE INVENTION

The high-temperature (~288° C.) water coolant in a boiling water reactor (BWR) is highly oxidizing due to dissolved, radiolytically produced chemical species, such as oxygen and hydrogen peroxide. These molecules are generated as the water passes through the reactor core and is exposed to very high gamma and neutron fluxes. The dissolved oxidants create a relatively high electrochemical potential (ECP) for structural materials in the coolant. Because of the high ECP, reactor structural materials in contact with the coolant, such as stainless steels and nickel-base alloys, can suffer intergranular stress corrosion cracking (IGSCC). This can limit the useful lifetime of reactor components, such as piping and pressure vessel internal structures, or result in a large inspection and repair cost in an effort to mitigate IGSCC effects in nuclear plants.

A number of countermeasures have been developed to mitigate IGSCC in BWRs. Of the various mitigation strategies, reducing the environmental aggressiveness (i.e., oxidizing potential, or ECP, of the coolant), can provide the best approach, since the coolant contacts all the potentially susceptible surfaces of interest. A primary strategy to reduce the ECP to some benign value has been to add hydrogen gas to the reactor feedwater in sufficient quantity that it is available to chemically combine, in the presence of a radiation field, with the dissolved oxygen and hydrogen peroxide to form water, thereby reducing the ECP below the IGSCC threshold value. Another strategy is directed towards providing IGSCC protection of selected high cost-impact reactor systems, such as piping, by reducing the ECP of these particular systems by inserting a catalytic recombiner upstream of the piping, or other system requiring IGSCC protection. The recombiner facilitates the reaction of a small (stoichiometric) hydrogen addition with the dissolved oxidants, and the oxidizing power of the water exiting the recombiner is reduced below the IGSCC threshold value downstream of the recombiner, up to the point where the water either mixes with higher oxidant-containing coolant, or again passes through the reactor core where radiolysis call recur.

The origin of ECP is based in the fundamental nature of metals, which are characterized by atoms consisting of an equal number of positive and negative charges (protons and electrons). Metals are formed from naturally occurring ores, or oxides, in which the metallic atoms are ionized. In the refining process, high energy and strongly reducing conditions are supplied to force the metallic ions in the ore to become a neutral metal by accepting additional electrons.

In subsequent use, however, metal atoms attempt to reject the added electrons to return to the lower energy (natural) state occurring in ores. If the metal is in contact with an electron acceptor, such as water containing dissolved oxidants, then electronic transfer from the metal to the acceptor is energetically favored, and an oxidation reaction (corrosion) can occur. The electrochemical potential is a measure, under certain fixed conditions, of the thermodynamic tendency for a metal to lose electrons and corrode. Forcing electrons into a metal contained in an oxidizing environment reverses this tendency and prevents, or inhibits, corrosion.

When a metal is in contact with an oxidizing solution, the ECP is a measure of the thermodynamic tendency for the metal atoms to ionize and enter the solution, leaving the metal with a net surface charge. This charge distribution is balanced by ions in the solution, which rearrange themselves in response to the electric field produced by the surface charge density. A boundary layer charge distribution results, and a potential difference exists across the boundary layer, between the metal surface and the neutral bulk solution. This potential difference can be measured, if combined with another "half-cell" electrode forming a crude battery. If the other half-cell accepts electrons, a corrosion reaction is allowed; if it supplies electrons to the metal, no corrosion can occur.

ECP is directly related to intergranular attack in thermally sensitized metals (IGSCC), if the dissolved oxidant concentration is sufficient to provide the necessary electrochemical driving force for this type of corrosion reaction. Typically, the ECP of austenitic stainless steels in the BWR piping coolant environment is about 100 mV on the standard hydrogen electrode (SHE) scale. The core and internals regions of the reactor are even more oxidizing due to higher levels of dissolved oxygen and hydrogen peroxide, produced radiolytically as the coolant flows through the high radiation fields of the core. Typical ECP values of 250 mV (SHE) are encountered in the reactor. Empirically, it is known that a threshold exists for onset of IGSCC, depending on the condition of the metal. If thermally sensitized, the threshold is −230 mV (SHE); if non-thermally sensitized, the threshold for irradiation-assisted IGSCC is −140 mV (SHE). Therefore, all strategies to date are based on lowering ECP below the threshold for IGSCC, either globally by addition of hydrogen gas to the reactor feedwater, or locally by promoting catalytic recombination of hydrogen and oxygen/peroxide dissolved in the coolant.

Both techniques involving hydrogen addition have the effect of reducing the oxidizing environment in contact with stainless steel piping and structural members. Many years of laboratory and reactor testing and analysis have led to the conclusion that these techniques are more or less effective, but massive additions of hydrogen required to globally suppress ECP have serious side effects that are undesirable in practice. For example, radiochemistry effects that produce the isotope N-16 in excessive amounts increase the radiation burden of the reactor system. Catalytic recombiners are expensive, bulky and add to the reactor pressure drop. Their effectiveness in suppressing oxidant concentrations is yet to be fully demonstrated. Therefore, alternative methods are required to lower ECP directly, without expensive hydrogen injection systems and catalytic recombiners.

SUMMARY OF THE INVENTION

The present invention is a method and an apparatus for electrically suppressing ECP near highly susceptible components of the BWR internals and piping. A method is described of providing self-contained means of locally protecting critical portions of metals, such as welds, by suppressing ECP in the immediate vicinity of that portion of the metal requiring protection in operating BWR plants. The method has the advantage over prior art in that a global reduction of ECP, through water chemistry control or large internal recombiners, is not required to adequately protect susceptible components. Rather, a small self-powered, electrical device is affixed to the metal area to be protected, which device has the capacity to locally suppress ECP automatically and continuously without provision for external power supplies, cables, penetrations, or other paraphernalia usually associated with electrical and electronic systems. The result is that IGSCC-susceptible components and piping are not as sensitive to the details of the water chemistry flowing over them and do not crack as much, or as rapidly, as presently.

The new technique disclosed herein is based on the concept of supplying electrons directly and locally to the sensitized zone(s) of the metal, thereby inhibiting IGSCC. The basic principles of this technique have been previously demonstrated at high temperature in laboratory tests of the straining electrode tests (SET) in impure environments using large equipment. Fortunately, only limited portions of the BWR piping and internals are sensitized to IGSCC, typically in the heat affected zones of welds and in certain crevices subject to stagnation conditions. Global suppression of ECP below −230 mV (SHE) by massive hydrogen addition may not be required, if the novel technique of the present invention is deftly applied, thereby avoiding costly installations and detrimental side effects of hydrogen water chemistry and/or catalytic recombiners.

DETAILED DESCRIPTION OF THE PREFERRED EMBODIMENTS

Figure 1:
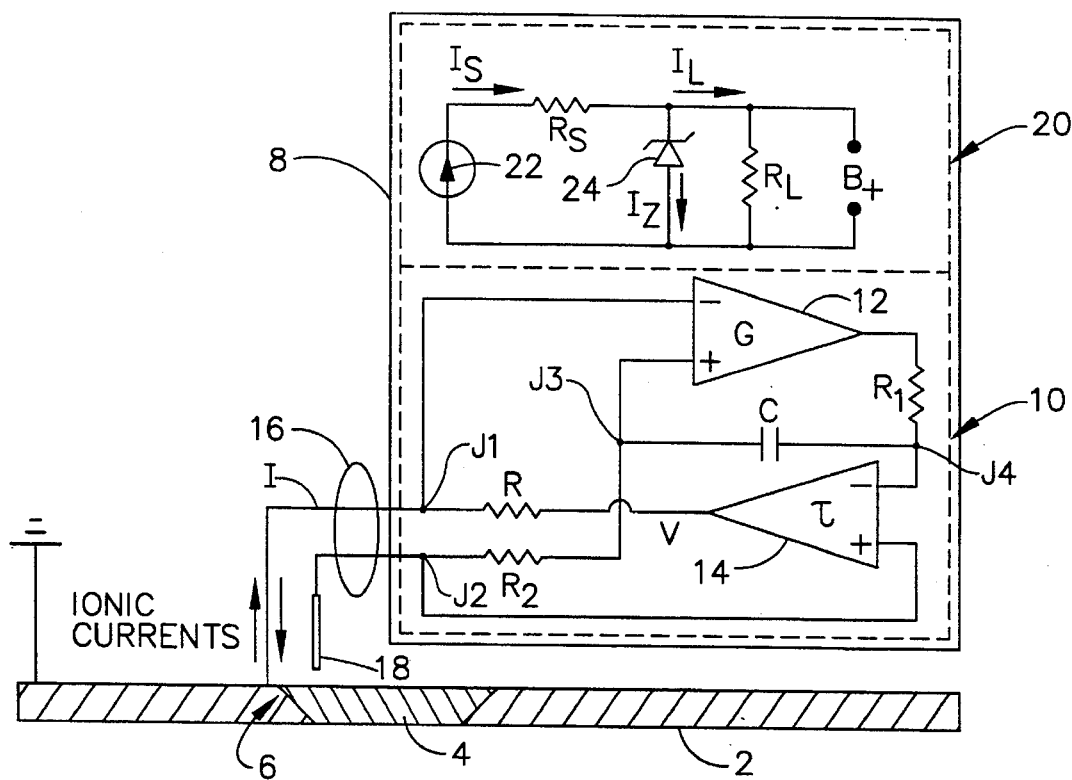
FIG. 1 is a schematic diagram of a self-contained IGSCC suppression system in accordance with the preferred embodiment of the invention.
Figure 1A:
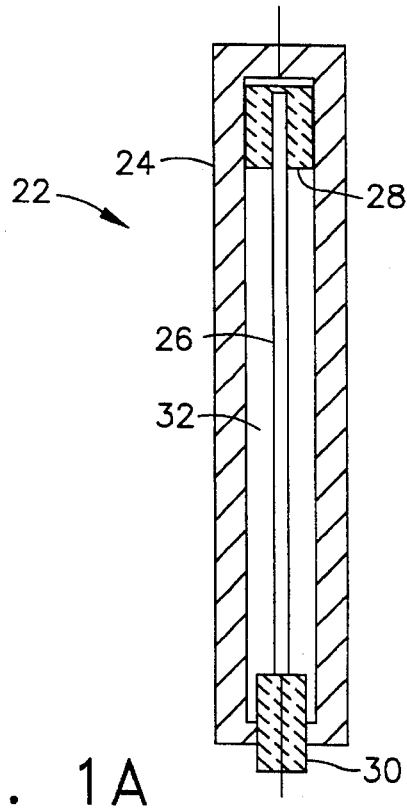
FIG. 1A is a schematic diagram of the current source incorporated in the system depicted in FIG. 1.

With reference to FIGS. 1 and 1A, a self-contained electrical system is depicted which supplies electrons to the surface of a sensitized metallic structural member 2, as in the case of the heat affected zone 6 of a weld 4. This is used as a typical example of a thermally sensitized metal zone, but sensitization could result from any known cause other than thermal sensitization. FIG. 1 shows a small, inexpensive, self-powered electrical system capable of supplying sufficient electrons to the metal surface to inhibit the corrosion reaction due to local ECP above the threshold value for IGSCC. The electronic components are fabricated from radiation-hardened semiconductors capable of withstanding relatively high γ-radiation fields such as those encountered inside the reactor pressure vessel, but outside the core region. The device is not intended for use in the core, where neutron fluxes are sufficiently high to destroy the components.

In accordance with the present invention, the source of electrons is the decay of a radioactive isotope, depicted in FIG. 1 as a current source 22. For ease of handling and fabrication, the isotope should be a β-emitter (nuclear electrons) without decay γ-radiation. A partial list of emitter isotopes includes H-3, C-14, Si-32, Sr-90 and Ru-106, with Ru-106 preferred because of its 368-day half-life and 39.4 keV β-ray. This type of radiation is easily stopped by a thin metal wall, for example. All these isotopes have a single decay mode with no γ radiation. About 1 gram of emitter material is sufficient to supply enough electrons for more than 2 years of operation.

Referring to FIG. 1A, the source assembly is a flat disk 24 of metal, containing the emitter isotope 26 electrically isolated from the metallic collector 24 by ceramic stand-off 28 and ceramic feed-through 30. The narrow space 32 between the emitter 26 and the collector 24 is evacuated during fabrication to efficiently collect electrons formed in the nuclear decay of Ru-106. A small pump-out tube (not shown) is used to evacuate the source enclosure after a ceramic-to-metal seal of the feed-through is made. The collector material could be nickel, or a nickel-base alloy, and the ceramics could be alumina to thermally match the metal. These are typical materials, but other possible combinations exist, which allow the device to reliably operate at reactor temperature.

Referring to FIG. 1, the power supply 20 requires no external power source, since it is energized by the nuclear decay electrons. Therefore, the device is self-contained, small and rugged when properly packaged using radiation-hardened integrated circuit technology (e.g., SiC semiconductor devices). The source current $I_S$ arises from the collection of nuclear decay electrons and produces a voltage across the source resistor $R_S$ which is a slowly decreasing function of time (because of the emitter decay). The Zener diode 24 and load resistor $R_L$ stabilize and limit the output voltage $B_+$, since the voltage drop across the diode is essentially the same for all reverse currents $I_Z$ flowing through it in the breakdown region of the device. The voltage $B_+$ is regulated and stabilized, since large changes in diode current produce small changes in diode voltage. The resulting voltage across the load resistor $R_L$, due to the load current $I_L$, is insensitive to the β-emitter decay and can be used to power the active components in the control circuit.

Evidently, this low-voltage DC power supply has a finite lifetime, since the emitter eventually decays to such a low activity level that it cannot produce a supply voltage sufficient to power the control circuit. This lifetime is determined by the type of emitter isotope, its activity and the design requirements of the operational amplifiers in the control circuit. Typically, it is about 2 years, or longer, if the emitter is Ru-106.

The center electrical conductor of a small mineral-insulated steel sheathed cable 16 is attached to the metal surface and connected to an electrical control circuit 10 that operates off the low-voltage DC power supply 20. The control circuit 10 and DC power supply 20 are enclosed in a housing 8 made of material able to withstand thermal and radiological conditions inside a boiling water reactor. The passive conductor of a twisted-shielded pair of cable conductors is connected to a reference electrode 18 located in the oxidizing coolant near the metal surface and to a terminal of the control circuit. The current collected at the metal surface is controlled by the applied voltage on the load resistor R via an electrical conductor connected to the surface of the metal to be protected and to another terminal of the control circuit. This current I is converted to a voltage drop across R, which is input to a differential amplifier 12 of gain G. The differential amplifier output is the effective voltage "error signal", which is integrated by the operational amplifier 14 with time constant $\tau = R_1 C$. The small stand-off resistor $R_2$ depletes excess charge build-up on the feedback capacitor C to eliminate any possibility of integrator malfunction. In accordance with the preferred embodiment of the control circuit 10, a first junction J1 is electrically connected to a first input terminal of the differential amplifier 12, to an output terminal of the operational amplifier 14 by way of a resistance R, and to the structural member 2 by a first electrical conductor; a second junction J2 is electrically connected to a first input terminal of the operational amplifier 14, to a first terminal of the resistance $R_2$, and to the reference electrode 18 by a second electrical conductor; a third junction J3 is electrically connected to a second input terminal of the differential amplifier 12, to a second terminal of the resistance $R_2$, and to a first terminal of the capacitance C; and a fourth junction J4 is electrically connected to a second terminal of the capacitance C, to the output terminal of the differential amplifier 12 byway of a resistance $R_f$, and to a second input terminal of the operational amplifier 14.

Figure 2:
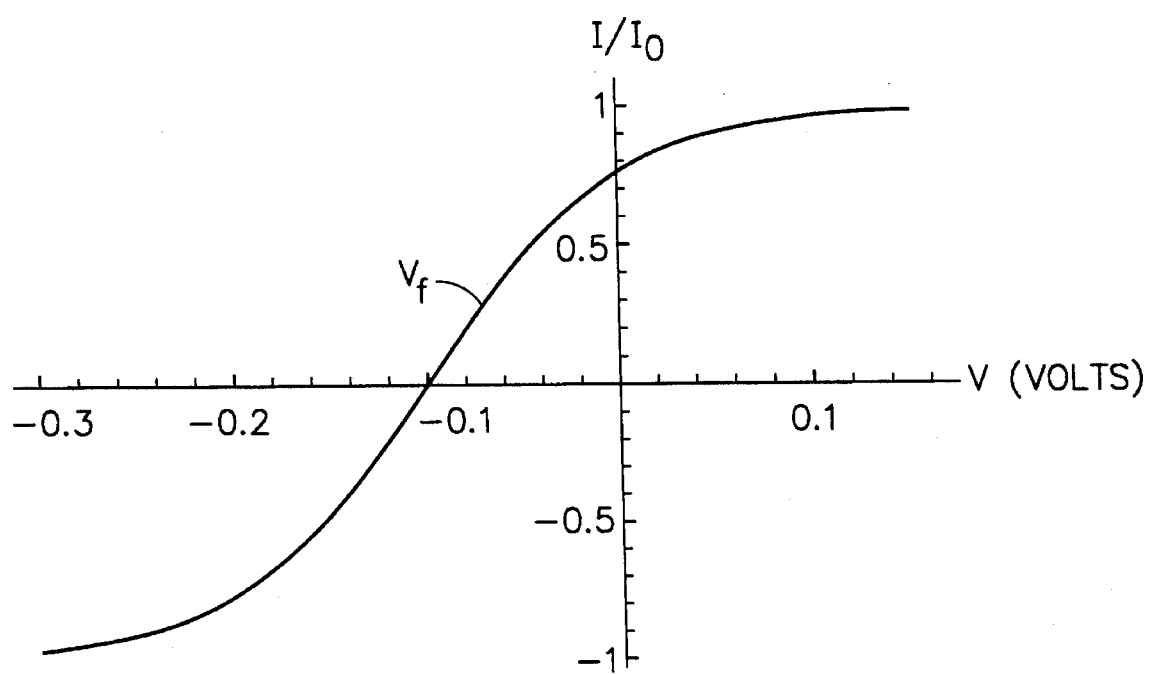
FIG. 2 is a graph of a typical current-voltage characteristic for an IGSCC suppression system in accordance with the present invention.

If the integrator output voltage V is positive, the current through the load resistor R is driven negative. If V is negative, the current through the load resistor R is driven positive. When the voltage drop is zero (i.e., the metal surface is at floating potential $V_f$), the current to the surface is zero, the desired operating point. A simple circuit analysis shows that the current through R decays, from a non-zero value to zero, exponentially with time. The net effect is that the collection voltage "hunts" for the zero-current condition at the surface, sliding along the curve shown in FIG. 2.

The collected current is dissipated in the load resistor R, which is sized to dissipate the small amount of energy. The gain and time constant are chosen so that the temporal behavior of the circuit averages any rapidly fluctuating changes in surface current arising in plant operations, further stabilizing operation. Therefore, no surface charge density can form, and no space-charge zone of either sign can exist near the metal surface for very long. Electron depletion of the metal and IGSCC are defeated by the invention, since electrons are forced to flow into the metal to compensate for those that would be lost by oxidation. In other words, the effective ECP of the metal/coolant couple is reduced below the local threshold automatically, no matter how the local water chemistry changes during reactor operations. There is no need to make a global change in ECP, since a small circuit "mouse" like that shown in FIG. 1 can be attached to a sensitized metal anywhere that can be accessed by the small MI cable. A multiplicity of such devices can be distributed around a weld, for example, to protect the entire heat-sensitized zone from IGSCC. The devices can be tack-welded to the metal member and all referenced to one, or a few, reference electrodes, as desired.

The IGSCC suppression system in accordance with the invention provides means for electrically minimizing net electron transfer at the surface of sensitized metals exposed to a coolant electrochemical potential, thereby inhibiting the basic physical process of intergranular attack of metal alloys, such as austenitic stainless steels. It utilizes an adaptive DC circuit with active element feedback to adjust the surface potential to minimize the current to the metal surface, thereby minimizing corrosion, such as IGSCC, independently of the details of the coolant chemistry. The invention further provides means for supplying sufficient electron current to minimize, or eliminate, local IGSCC through the application of a regulated nuclear decay power supply, thereby giving the device a stand-alone capability useful in nuclear reactor applications. The invention utilizes a unique, compact configuration that is specific to the local minimization of IGSCC and is a low-cost answer to crack initiation and growth in reactors, caused by intergranular attack of austenitic stainless steels used in reactor internals and piping. In accordance with a further aspect of the invention, it provides means for essentially eliminating undesirable IGSCC without impacting the operating performance of the nuclear plant. Lastly, the unique IGSCC suppression system of the invention can be retrofitted into existing plants as a field replacement, with minimal time and cost, thereby reducing future maintenance and repair costs attributable to IGSCC in operating BWR plants.

The invention is expected to be especially useful in operating plants where the water chemistry in vessels and piping can be variable, unpredictable and plant-specific. The invention also has application in other contexts, such as corrosion control in petrochemical or industrial environments.

The preferred embodiments have been disclosed for the purpose of illustration only. Variations and modifications of those embodiments will be readily apparent to electronics engineers of ordinary skill. All such variations and modifications are intended to be encompassed by the claims appended hereto.

We claim:

1. An electrical system for locally reducing electrochemical potential in the vicinity of a metal surface immersed in water, comprising a control circuit powered by a battery power supply, said control circuit and said battery power supply being enclosed in a housing, said control circuit having first and second terminals which penetrate said housing, a first electrical conductor for electrically coupling said first terminal to the metal surface, a reference electrode for placement outside said housing in water near the metal surface, a second electrical conductor for electrically coupling said reference electrode to said second terminal, and a sheathed cable which encases said first and second electrical conductors, wherein said control circuit comprises means for supplying electrons to the metal surface via said first electrical conductor whenever the electrochemical potential between the metal surface and the water is above a threshold level, above which the metal is susceptible to stress corrosion cracking.

2. The system as defined in claim 1, wherein said electron supplying means comprise a differential amplifier having a first input electrically connected to a first junction, a second input electrically connected to a first resistance, and an output for outputting a voltage signal proportional to the difference between the voltage signals at said first and second inputs, wherein said first terminal is electrically connected to said first junction, said second terminal is electrically connected to a second junction, and said first resistance is electrically connected to said second junction.

3. The system as defined in claim 2, wherein said electron supplying means further comprises a second resistance electrically connected to said output of said differential amplifier, a third resistance electrically connected to said first junction, and an operational amplifier having a first input electrically connected to said second resistance, a second input electrically connected to said second junction, and an output connected to said third resistance.

4. The system as defined in claim 1, wherein said first electrical conductor is connected to a heat-affected zone in a welded component.

5. An electrical system for locally reducing electrochemical potential in the vicinity of a portion of metal to be protected, comprising a control circuit powered by a battery power supply and having first and second terminals, a first electrical conductor for electrically coupling said first terminal to the surface of the metal to be protected, a reference electrode for placement in electron-accepting fluid near the metal surface, and a second electrical conductor for electrically coupling said reference electrode to said second terminal, wherein said control circuit comprises means for supplying electrons to the metal surface via said first electrical conductor under conditions when the metal is susceptible to stress corrosion cracking, wherein said battery power supply comprises a current source containing β-emitting material.

6. The system as defined in claim 5, wherein said β-emitting material is the Ru-106 isotope.

7. The system as defined in claim 1, wherein said battery power supply comprises a current source, a first resistance and a Zener diode connected in series to form a closed circuit, and a second resistance connected in parallel across said Zener diode.

8. The system as defined in claim 5, wherein said current source comprises a flat disk of β-emitting material housed inside a metallic collector and electrically isolated from said metallic collector by ceramic insulating means.

9. An electrical system comprising a control circuit powered by a battery power supply and having first and second terminals, said control circuit and said battery power supply being contained inside a housing which is penetrated by said first and second terminals, first and second electrical conductors electrically connected to said first and second terminals respectively, a sheathed cable encasing said first and second electrical conductor, and an electrode electrically connected to said second electrical conductor, wherein said control circuit comprises:

a first junction electrically connected to said first terminal;

a second junction electrically connected to said second terminal;

a first resistance electrically connected to said first junction;

a second resistance electrically connected to said second junction;

a differential amplifier having a first input electrically connected to said first junction, a second input electrically connected to said second resistance, and an output for outputting a voltage signal proportional to the difference between the voltage signals at said first and second inputs;

a third resistance electrically connected to said output of said differential amplifier;

an operational amplifier having a first input electrically connected to said third resistance, a second input electrically connected to said second junction, and an output electrically connected to said first resistance.

10. The system as defined in claim 9, wherein said control circuit comprises a third junction located between said second input of said differential amplifier and said second resistance, a fourth junction located between said first input of said operational amplifier and said third resistance, and a capacitor having one terminal connected to said third junction and a second terminal connected to said fourth junction.

11. An electrical system comprising a control circuit powered by a battery power supply and having first and second terminals, said control circuit and said battery power supply being contained inside a housing, wherein said control circuit comprises:

a first amplifier having a first input electrically coupled to said first terminal, a second input electrically coupled to said second terminal by way of a first resistor, and an output for outputting a voltage signal proportional to the difference between the voltage signals at said first and second inputs; and a second amplifier having a first input electrically coupled to said output of said first amplifier by way of a second resistor, a second input electrically coupled to said second terminal, and an output connected to said first terminal by way of a third resistor, wherein said battery power supply comprises a current source containing β-emitting material.

12. The system as defined in claim 11, wherein said β-emitting material is the Ru-106 isotope.

13. The system as defined in claim 9, wherein said battery power supply comprises a current source, a fourth resistance and a Zener diode connected in series to form a closed circuit, and a fifth resistance connected in parallel across said Zener diode.

14. The system as defined in claim 11, wherein said current source comprises a flat disk of β-emitting material housed inside a metallic collector and electrically isolated from said metallic collector by ceramic insulating means.

15. A method for locally reducing electrochemical potential in the vicinity of a metal surface immersed in the water coolant of a light water reactor high-temperature, comprising the steps of:

immersing a reference electrode in the water coolant in the vicinity of said metal surface;

connecting an electrical conductor to said metal surface;

detecting a difference in potential between the metal surface and the water coolant surrounding said reference electrode; and supplying a current of electrons to said metal surface via said electrical conductor whenever the difference in potential between the metal surface and the water coolant surrounding said reference electrode is above a threshold level corresponding to a predetermined electrochemical potential above which the metal is susceptible to stress corrosion cracking.

16. The method as defined in claim 15, wherein the current of electrons is sufficient to compensate for the electrons lost by the metal to said water coolant.

17. The method as defined in claim 15, wherein said metal is a heat-affected zone in a welded component.

18. A method for locally reducing electrochemical potential in the vicinity of a portion of metal in contact with electron-accepting fluid, comprising the steps of:

placing a reference electrode in the electron-accepting fluid in the vicinity of said portion of metal;

connecting an electrical connector to said portion of metal; and supplying a current of electrons from a source of electrons to the metal surface via said electrical conductor, said current having a magnitude which is a function of the difference between the potential of said reference electrode and the potential of said portion of metal, wherein said source of electrons comprises β-emitting material.

19. The method as defined in claim 18, wherein said β-emitting material is the Ru-106 isotope.

* * * * *